United States Patent [19]

Kauffmann

[11] 4,090,474

[45] May 23, 1978

[54] HOT WATER BOOSTER

[76] Inventor: Walter E. Kauffmann, 67 Morton St., Brentwood, N.Y. 11717

[21] Appl. No.: 692,799

[22] Filed: Jun. 4, 1976

[51] Int. Cl.² .......................... F22D 1/00; F22B 1/18
[52] U.S. Cl. ................................. 122/20 B; 237/19
[58] Field of Search ................. 237/19; 122/20 B, 421

[56] References Cited

U.S. PATENT DOCUMENTS

| | | | |
|---|---|---|---|
| 2,613,653 | 10/1952 | Wald | 122/20 |
| 2,920,608 | 1/1960 | Orban | 122/20 |
| 3,896,992 | 7/1975 | Borovina | 122/20 |

Primary Examiner—Kenneth W. Sprague
Attorney, Agent, or Firm—Robert D. Farkas

[57] ABSTRACT

A water heating system comprising an exhaust gas water preheating coil supplying water via a storage tank to a water heating boiler.

2 Claims, 1 Drawing Figure

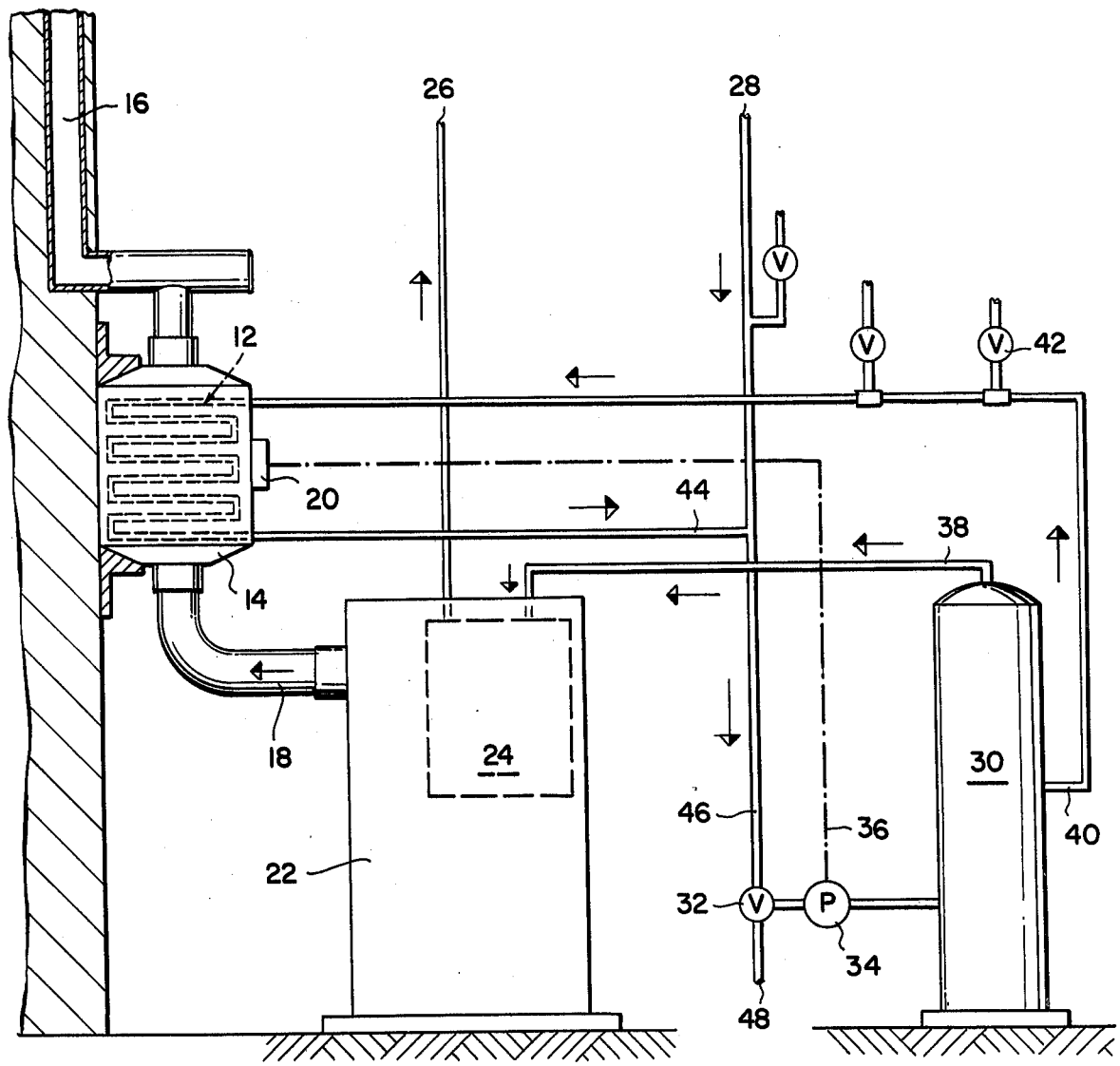

HOT WATER BOOSTER

BACKGROUND OF THE INVENTION

1. Field of the Invention

This invention relates to water heating systems as commonly used in homes.

2. Prior Art

There have been many water heating systems disclosed and used, comprising various types of furnaces for buring different types of fuel, boilers, tanks, pumps and controls. Water preheating systems have been known, including some that use exhaust gas as the heating energy. Hill, in U.S. Pat. No. 1,226,516 discloses a flue gas preheater; Marquez in U.S. Pat. No. 3,793,992 discloses a coil preheater. None of the prior art discloses an exhaust gas water preheating system employing a storage tank within which cold and preheated water mix and which is employed for space heating.

SUMMARY OF THE INVENTION

It is therefore an object of this invention to overcome the limitations and disadvantages in the water heating systems in the prior art and currently available in the market.

One of the objects of the invention is to provide a water heating system embodying improved principles of design and construction.

An important object of the invention is to provide a water heating system which is comprised of a number of simple durable parts and components which can be economically manufactured and readily assembled.

A significant object of the invention is to provide a water heating system improvement, so designed and constructed that it can be readily applied to almost any typical domestic hot water system now in use by the addition of a few known components.

Another object of the invention is to provide a fuel saving water heating system.

A further object of the invention is to increase the capacity of existing water heating systems without appreciably increasing operating costs.

Yet another object of the invention is to provide free heat to a limited space of a house.

A water heating system, according to the principles of this invention, comprises, in addition to a conventional boiler and furnace, an exhaust flue water preheating coil, a water storage tank, a thermally switch controlled electrically operated water circulating pump, and suitable pipes and valves.

Further objects and advantages of this invention will appear more clearly from the following description of a non-limiting illustrative embodiment and the accompanying drawing.

DESCRIPTION OF THE DRAWING

Briefly summarized, a preferred embodiment of the invention is described in conjunction with an illustrative disclosure thereof in the accompanying drawing, which:

is a schematic representation of the water heating system according to the principles of this invention.

DESCRIPTION OF THE TYPICAL EMBODIMENT

In the drawing a heating system for hot water embodying features of the invention is illustrated comprising a boiler 24 having water pipes, a furnace 22 for burning a fuel, exhaust flue 18, 14, 16 for the gaseous spent exhaust products of the combustion, a water preheating coil 12 disposed within flue 14 and connected via pipe 44 to water supply pipe 28, 46 leading to water storage and mixing tank 30 whence water is drawn off to the boiler heating coils 24 via pipes 38 and to the preheating coil 12 via pipes 40.

Cold water is supplied to the house by branches from pipe 28. Hot water is supplied to the house by pipe 26 from boiler coils 24 and by pipe 40 through valves 42.

Water tank 30 may be dumped through valve 32 out pipe 48 which is used to drain at least part of the system.

A water circulating pump 34 may be employed to increase the reliability of the system and may be controlled by a heat sensor 20 disposed adjacent to gas exhaust flue 14, and the heat sensor may be part of an electrical switch to control the pump responsively to heating conditions of the water.

Water tank 30 may be used to mix water of various temperatures, to supply water to the preheater and to the boiler, to store water for the system, to store warm water, to supply warm water upon demand to the house, and to supply heat to the house space within which the tank is located.

Obviously, no fuel costs are required by the preheating coil 12 and fuel is saved by reducing the fuel requirement if the total quantity of hot water is not increased. If additional hot water is desired, it is available. The boiler running or "on" time, for the same amount of hot water, is reduced.

The various parts of the system can be purchased or made by known manufacturing methods of known materials.

From the foregoing, the construction and operation of the device will be readily understood and further explanation is believed superfluous.

The invention includes all novelty residing in the description and drawings. It is obvious to those skilled in the art that various minor changes can be made without departing from the concept of this invention and all such as fall within the reasonable scope of the appended claims are included.

I claim:

1. A heating system comprising a fuel consuming furnace having an exhaust flue for the egress of stacked gases, a water pre-heating coil, said water pre-heating coil installed within said exhaust flue, said water pre-heating coil having first and second pipes at the ends thereof, said fuel consuming furnace having heating coils therein, said heating coils having an inlet end and an outlet end for the passage of water therethrough, said outlet end for communicating hot water for consumption, a water storage and mixing tank, said water storage and mixing tank having first and second outlet pipes communicating to the interior of said water storage and mixing tank, said first outlet pipe of said storage and mixing tank fluidly communicating with said inlet end of said heating coils, said second outlet pipe of said storage and mixing tank fluidly communicating with said second pipe, a cold water supply pipe, said cold water supply pipe communicating fluidly to a source of cold water, said cold water supply pipe and said first pipe of said water pre-heating coil fluidly communicating to each other into an inlet pipe communicating to said interior of said storage and mixing tank a heat sensor, said heat sensor being disposed adjacent said exhaust flue in the vicinity of the location of said water pre-heating coil, said heat sensor for operating a pump, said pump discharging water into said inlet pipe of said storage and mixing tank wherein the temperature sensed by said heat sensor is elevated to a predetermined level.

2. The apparatus as claimed in claim 1 further comprising a branch connection between said second outlet pipe of said storage and mixing tank and said second pipe of said water pre-heating coil, said branch connection including a hot water discharge pipe, said hot water discharge pipe having a shut-off valve.

* * * * *